United States Patent [19]

Altmann et al.

[11] Patent Number: 4,727,638

[45] Date of Patent: Mar. 1, 1988

[54] LOW COST RING LASER ANGULAR RATE SENSOR

[75] Inventors: Gerald R. Altmann, Rodgers; Mark W. Weber, Elk River, both of Minn.

[73] Assignee: Honeywell Inc., Minneapolis, Minn.

[21] Appl. No.: 879,746

[22] Filed: Jun. 27, 1986

[51] Int. Cl.⁴ .............................................. B23P 17/00
[52] U.S. Cl. ................................... 29/417; 29/525
[58] Field of Search ................... 29/412, 417, 525; 356/350; 372/33, 94; 455/605, 609

[56] References Cited

U.S. PATENT DOCUMENTS

| | | | |
|---|---|---|---|
| 3,390,606 | 7/1968 | Podgorski | 356/350 |
| 3,503,005 | 3/1970 | Mocker | 356/350 X |
| 4,047,186 | 9/1977 | Kendall et al. | 29/417 X |

Primary Examiner—Timothy V. Eley
Attorney, Agent, or Firm—Robert A. Pajak

[57] ABSTRACT

Disclosed is a method of making a plurality of ring lasers or ring laser blocks from a single block of material.

8 Claims, 8 Drawing Figures

LOW COST RING LASER ANGULAR RATE SENSOR

BACKGROUND OF THE INVENTION

This invention relates to a novel construction for a ring laser angular rate sensor and more particularly to a construction which is less costly to manufacture than prior art constructions.

After years of development, ring laser angular rate sensors, commonly referred to as ring laser gyros, have become commercially successful products and are rapidly replacing conventional mechanical angular rate sensors in many applications. Today, most commercial ring laser angular rate sensors use a mechanically and thermally stable block construction and mechanical dither concepts taught in U.S. Pat. Nos. 3,390,606; 3,467,472; and 3,373,650, which are incorporated herein by reference.

These prior art ring laser angular rate sensors have proven highly satisfactory in operation and as previously mentioned are rapidly gaining widespread acceptance for certain applications. These prior art ring laser angular rate sensors, however, are costly to manufacture.

SUMMARY OF THE INVENTION

An object of this invention is the provision of a novel construction for a ring laser angular rate sensor which permits it to be inexpensively manufactured.

Another object of the invention is the provision of a ring laser angular rate sensor whose overall size, including its dither motor, is extremely small—e.g., less than 2 inches in diameter.

Briefly, this invention contemplates the provision of a ring laser angular rate sensor constructed from a solid glass block with lasing paths machined therein and mirrors joined to the block with a thermally formed hermetic seal. A refocusing mirror with a short radius of curvature in combination with a short path length are features of this novel construction.

DESCRIPTION OF THE INVENTION

Figure 1:
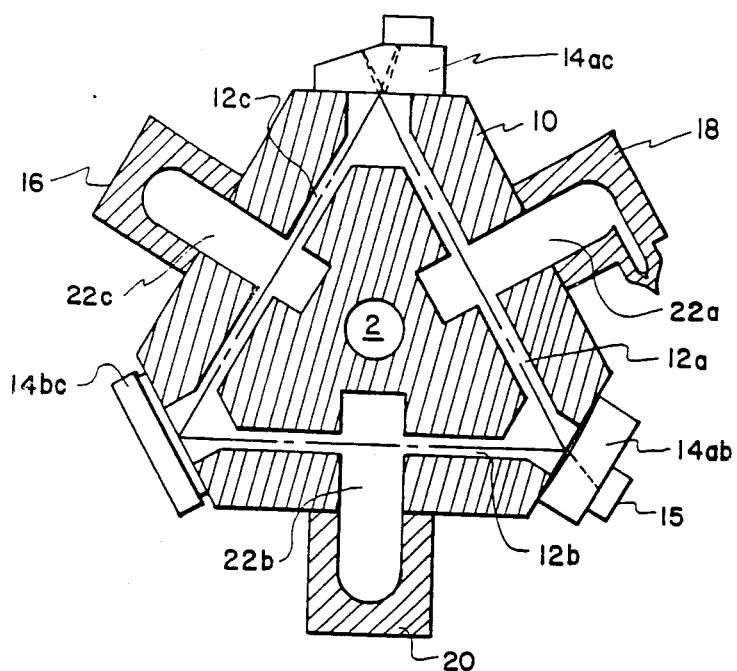
FIG. 1 is a plan view—with parts in section—of a ring laser angular rate sensor constructed in accordance with the teaching of this invention.

Referring now to FIG. 1, a silicate glass block 10, more particularly a borosilicate, preferably BK-7 (letter number combinations are Schott Optical commercial designations), has bores 12a, 12b, and 12c machined therein to form a triangular lasing cavity. Mirrors 14ac; 14ab; and 14bc are attached to the block at the intersections of the paths 12. It will be appreciated that ring laser angular rate sensors with a rectangular lasing cavity or other cavity configurations, including a cubic cavity, can be constructed in accordance with the teaching of this invention.

The mirrors and how they are attached to the block 10 will be described in detail hereinafter. Each of the mirrors perform functions in addition to redirecting the laser beam; mirror 14ac is partially transmissive for providing a readout beam signal; mirror 14ab is curved and focuses the counter-rotating laser beams, and mirror 14bc controls the cavity path length. A sensor 15 attached to mirror 14ab provides path length control signals to mirror 14bc as in prior art ring laser angular rate sensors. A suitable readout device for use in combination with mirror 14ac is disclosed in a copending application entitled, "Readout for Ring Laser Angular Rate Sensors", by Killpatrick, having Ser. No. 732,297.

An anode 16 and a pair of cathodes 18 and 20 are fixed to the block 10 and will be described in greater detail in connection with FIG. 4. As will be appreciated by those skilled in the art, these electrodes couple electrical energy into a gas which fills the cavities and generates the counter-rotating laser beams.

There are cylindrical passages 22a, 22b, and 22c machined into the block 10 where the cathodes and anode are attached to the block. These passages allow the lasing gas to communicate with the interior surfaces of the cathodes and anode. Advantageously, the bores 22a, 22b, and 22c extend into the block beyond the paths in order to provide reservoirs to increase the total gas volume of the system.

There is a bore 2 entirely through the block 10 in a direction perpendicular to the plane formed by the paths 12. This passage may be used to accommodate a compact dither motor preferrably disclosed in a copending application entitled, "A Dither Suspension Mechanism for a Ring Laser Angular Rate Sensor", filed on even date, May 10, 1985, by Hanse, et al., having Ser. No. 733,278, and assigned to the assignee of the present invention.

Although the construction of the ring laser angular rate sensor in accordance with the teaching of the invention is novel, its basic operating principle is the same as those of prior art ring laser angular rate sensors. Briefly, the cavities within the block 10 are filled with a lasing gas of helium neon mixture. An electric field between the anode 16 and the cathodes 18 and 20 establishes counter-rotating laser beams within the passages 12 in the block 10. Rotation of the block 10 causes the frequency of one of the counter-rotating beams to increase, and the other to decrease. The frequency difference is detected by a suitable sensor mounted to mirror 14ac. The photodetector output signals are processed in a suitable manner well understood by those skilled in the art.

Figure 2:
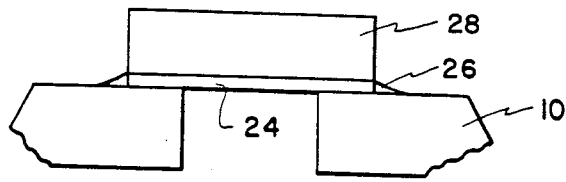
FIG. 2 is a partial sectional view showing detail of a mirror sealed to the ring laser angular rate sensor block.

Referring now to FIG. 2, an important contributor to reducing the construction cost in accordance with the teaching of this invention is the use of a frit seal between the mirror 14 and the solid block 10 in place of the optical contacts generally used in prior art ring laser angular rate sensors. In the preferred embodiment of the invention, the ring laser angular rate sensor block 10 is a solid block of BK-7 glass into which the lasing paths are machined, as previously explained. A substrate 28 for each mirror is also formed from BK-7 glass. A laser reflective coating 24 is formed on the surface of the substrate 28 in a suitable manner known to those skilled in the art. A coating comprised of a layer of titanium dioxide and a layer of silicon dioxide is suitable.

The choice of material for the solid block 10, the substrate 28, and the coating 24 is dictated by the need to have compatible coefficients of expansion for the solid block 10, the substrate 28, and the coating 24. With compatible coefficients of expansion a thermally formed frit sealing process can be used to join the substrate 28 to block 10. As will be appreciated by those skilled in the art, the frit seal is formed with a soldered glass or frit material 26 in a process in which temperatures are raised to the range of 450°-500° C. for a substantial period of time, emphasizing the need for each of the parts to have a compatible temperature coefficient of expansion.

Figure 3:
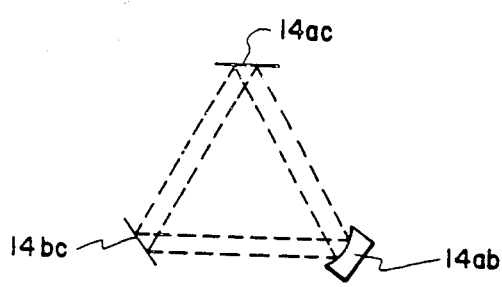
FIG. 3 is a schematic view of the laser cavity and the curved focusing mirror.

Referring now to FIG. 3, flat mirrors 14bc and 14ac and a curved mirror 14ab circulate the counter-rotating beams in the cavity formed by the passages 12ab, 12ac, and 12bc machined into the block 10. The cavity confines the laser beam, stabilizes it against angular distortion of the block, and forces the laser to oscillate in a singular transverse mode. The diameter of the laser gain fuse should be chosen as to provide gain and intercavity aperture to discriminate against off-access modes. A gain tube diameter of 0.030 inches has proven satisfactory.

It is important that a ring laser angular rate sensor constructed in accordance with the teaching of this invention have a short cavity. Applicants have determined that a cavity of approximately 2.4 inches is satisfactory. A cavity in excess of six inches in length would ordinarily be impractical.

The focusing mirror 14ab has a curved reflecting surface with a short radius of curvature. As the radius of curvature of the mirror 14ab decreases, the amount of misalignment in the cavity which can be tolerated increases to a limit where the radius equals the path length. Beyond this, i.e., radius less than the cavity length, the lasing beams become unstable. In a preferred embodiment of the invention, the radius of curvature of mirror 14ab is 15 cm to 20 cm with a cavity length of about 6 cm. The radius can vary as the cavity length varies with the range of an inner limit equal to the path length and an outer limit of six times the path length.

Figure 4:
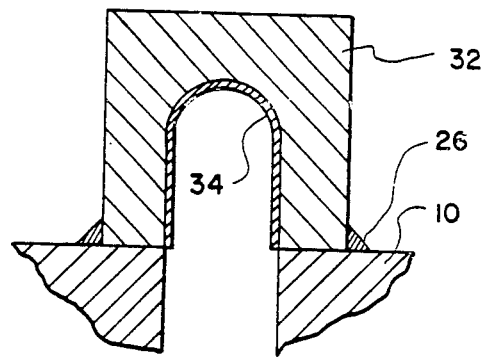
FIG. 4 is a partial sectional view illustrating the construction of the laser electrodes.

Referring now to FIG. 4, as in the prior art devices, the electrodes provide an electrical connection to the laser gas. Each of the electrodes, one anode and two cathodes, is made to match the thermal coefficient of expansion of the block 10. This enables the use of a thermal bonding process to affix the electrodes to the block 10 and provide a hermetic seal there between. To these ends a base 32 made from nickle-iron alloy and its intersurface is coated with a thin layer of aluminum 34. The base 32 is illustrated to be secured to block 10 by a soldered glass 26 similar to the assembly illustrated in FIG. 2. The ratio of Ni to Fe can be adjusted so that this Invar type material has a thermal coefficient of expansion which is compatible with the thermal coefficient of the block 10. To match a BK-7 block, a mixture of about Ni-49%, Fe-50% and 1% materials to improve machinery, etc., is satisfactory. It should be noted that the walls of the electrodes should be thin to provide flexibility where the electrode is attached to the block 10. This construction compensates for any relative movement between the block and the electrode due to thermally or mechanically induced stress.

Figure 5:
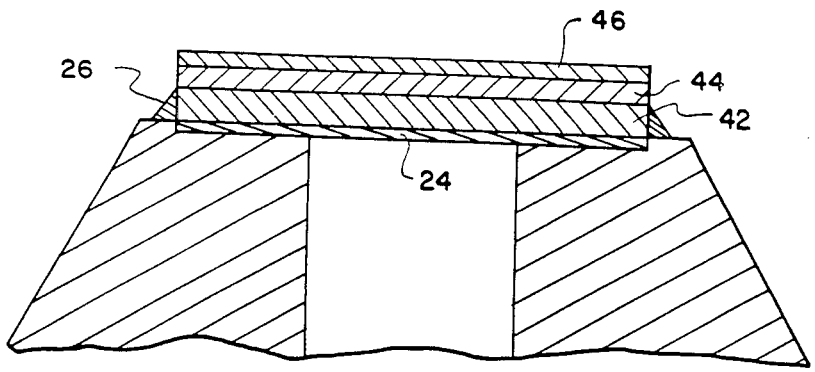
FIG. 5 is a detailed sectional view of a simple, novel path length control device useful in the practice of applicants' invention.

Referring now to FIG. 5, as in the prior art, a path length control mirror maintains the length of the cavity at an integral number of wave lengths in accordance with the techniques known to those skilled in the art. However, the construction of the path length control mirror shown in FIG. 5 is novel and advantageous as it is dramatically simple and more straightforward then those employed in the prior art.

The novel path length control comprises a substrate 42 with reflective coating 24 affixed to the block 10 all in the manner described in connection with FIG. 2 with a BK-7 block 10 and a BK-7 substrate 42. The substrate 42 is relatively thin e.g., 0.020 inches thick, in a preferred embodiment. Bonded to the mirror substrate 42 are two piezoelectric wafers 44 and 46. As will be appreciated by those skilled in the art, the orientation of the wafers 44 and 46 relative to one another is such as to cancel the effect of temperature changes. Each of the wafers are preferably ½ the thickness of the mirror substrate.

Figure 6:
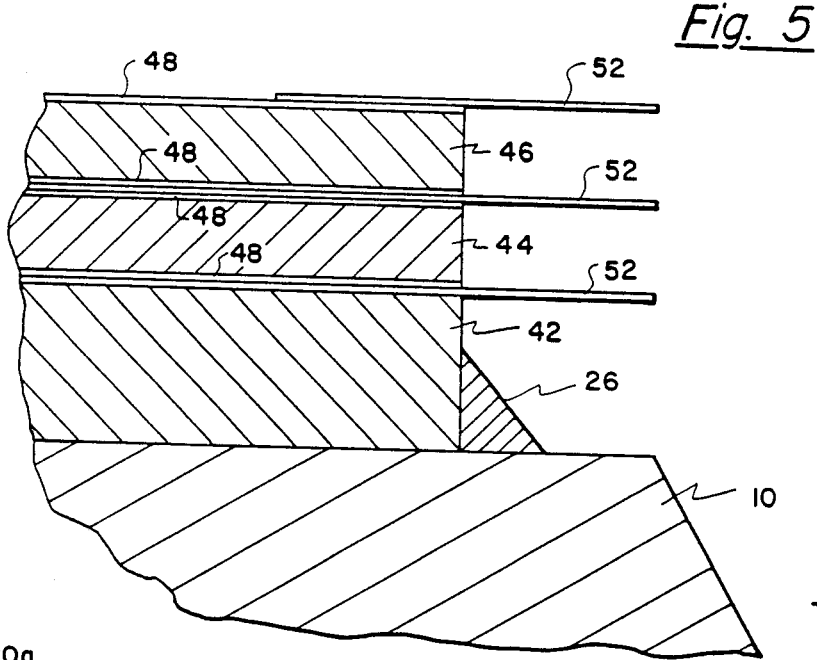
FIG. 6 is an enlarged, detail view of the structure of FIG. 5.

Referring now to FIG. 6 as well as FIG. 5, a conductive electrode 48 is deposited over the entire upper and lower surface of each of the piezoelectric wafers 44 and 46. The lower wafer 44 is bonded to mirror substrate 42 with a suitable epoxy, and similarly the upper wafer 46 is epoxy bonded to the lower wafer 44. Conductive tabs 52 are attached to the electrode surfaces and permitted appropriate signals to be coupled to the piezoelectric crystals in order to deflect the mirror substrate and thus alter the path length so that the path length is an integral number of wavelengths.

The assembly as just described may be similarly bonded to block 10 like the assembly illustrated in FIGS. 2 and 3. That is, a soldered glass 26 may again be employed.

The foregoing description teaches a novel construction technique for providing low cost ring laser angular rate sensors. This technique leads to a method of constructing a laser block for use as a ring laser and specifically, a ring laser angular rate sensor.

Figure 7:
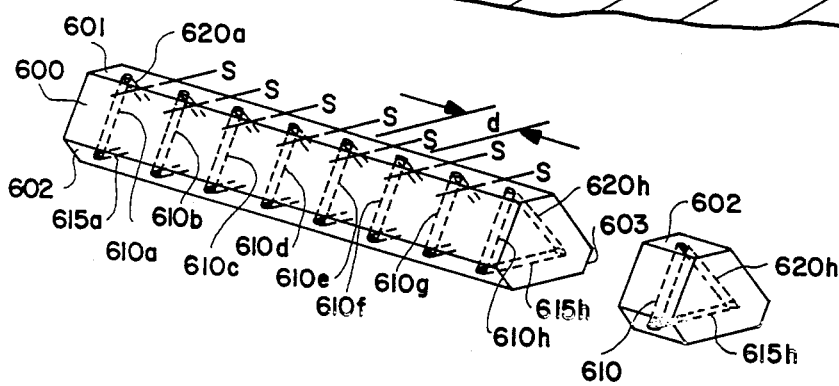
FIG. 7 is an oblique representation of a block formed and bored for providing a plurality of ring laser blocks having a triangular laser path.
Figure 8:
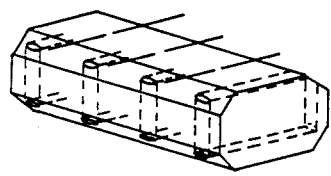
FIG. 8 is an oblique representation of a block formed and bored for providing a plurality of ring laser blocks having a rectangular laser path.

FIG. 7 illustrates a method of manufacture which provides a low cost technique of making ring laser blocks. The large block 600 is comprised of a material as that described for laser block 10 shown in FIG. 1. The block is milled or cut, or the like, to form flat surfaces 601, 602 and 603. The flat surfaces are arranged along the length of the block in a manner such that there exists a normal to each of the flat surfaces which are all coplanar.

Further, the flat surfaces are arranged relative to each other as will be subsequently described. It should be understood by the reader that for a laser beam to traverse an optical closed-loop polygon path, the laser beam must follow the laws of optics. Specifically, when a laser beam impinges upon a reflecting surface, the angle of incidence must be equal to the angle of reflection. The proper arrangement of the flat surfaces relative to each other is one which permits connected line segments extending between said flat surfaces to form the closed-loop polygon, and in which a normal to each of the flat surfaces passes through the vertex of adjacent one of the connected line segments intersecting the flat surfaces. If the block is bored to provide cavities along the line segments between the flat surfaces, 601, 602 and 603, and reflecting means are located at each of the surfaces, the cavity will support a closed-loop optical beam.

In FIG. 7 tunnels or cavities 610a-h are bored through block 600 and extending between surfaces 601 and 602. Each of the tunnels 610a-h are separated by a distance D and being substantially in parallel with each other. In a similar manner, tunnels 615a-615h are bored through block 600 extending between surfaces 602 and 603, and tunnels 620a-620h are bored through block 600 extending between surfaces 601 and 603.

The set of tunnels 610, 615 and 620 form a polygon path shown in the form of a triangle where the surfaces 601, 602, and 603 form vertices of the polygon substantially at the surfaces 601, 602, and 603. The set of tunnels forming the polygon are bored through the block such that each of the polygons defined by the plurality of tunnels are also substantially in parallel. Lastly, the surfaces are arranged relative to each other such that the normal to the surfaces passes through the vertex of adjacent connecting tunnels so as to bisect the angle between the tunnels. This arrangement will provide an optical closed-loop path.

In order to make a ring laser, mirrors must be affixed to surfaces 601, 602 and 603 to form an optical closed-loop path which may be propagated by laser beams substantially indicated in FIG. 1. In order to affix mirrors to the block, surfaces 601, 602, and 603 must be polished to a degree of smoothness required by the technique and the materials chosen in order to affix the mirrors to the block.

After the block has been properly bored and polished, block 600 may be sliced at slice markers "s" to form individual ring laser blocks which may be subsequently processed in accordance with the invention as illustrated in FIG. 1.

Alternatively, mirrors, for example 14ab, 14ac, and 14bc, can be affixed to the block before slicing. In one embodiment of the invention, all of the mirrors 14 are press-fitted against the block at surfaces 601, 602, and 603. A frit seal may be applied to the mirrors. Then the blocks and the entire assembly is elevated in temperature to form the gas tight seal.

Subsequent to the mirror assembly, the individual assemblies may be sliced from the block to provide individual ring laser blocks including the thermally formed sealed combination of mirrors and block.

It should be recognized by those skilled in the art, that the method of assembly as just described is also applicable assemblies where the mirrors are sealed to the block using optical contact technique. Specifically, surfaces 601, 602, and 603 may first be highly polished to provide an optical seal. It should be understood that an ultra high polished surface is required for an optical contact seal.

The block material and mirrors may be comprised of a glass such as BK-7 or Zerodur, quartz, or any other such material which will have characteristics suitable for the application.

Those skilled in the art will recognize that only preferred embodiments of the present invention is disclosed herein and that the embodiment may be altered and modified without departing from the true spirit and scope of the invention as defined in the accompanying claims.

The embodiments of the invention in which an exclusive property or right is claimed are defined as follows:

1. A method of making a ring laser comprising:
    forming at least three flat surfaces on a block, said flat surfaces each having a normal to the plane thereof, and all of said normal to said surfaces being substantially coplanar, said flat surfaces arranged relative to each other to permit a selected group of connected line segments extending between said flat surfaces to form a closed-loop polygon in which a normal to each of said flat surfaces passes through the vertex of adjacent ones of said connected line segments, intersects the flat surface, and bisects the angle between said adjacent line segments;
    boring a first set of cavities through said block along said selected group of line segments;
    boring at least a second set of cavities through said block similarly arranged as said first set of cavities;
    affixing mirrors to said flat surfaces; and
    slicing said block into separate block portions having a single set of cavities.

2. The method of claim 1 further comprising the step of polishing said flat surfaces before affixing said mirror to said flat surface.

3. The method of claim 1 wherein said polygon is a triangle.

4. The method of claim 1 wherein said block is comprised of a boro-silicate glass.

5. A method of making a ring laser comprising:
    forming at least three flat surfaces on a block, said flat surfaces each having a normal to the plane thereof, and all of said normal to said surfaces being substantially coplanar, said flat surfaces arranged relative to each other to permit a selected group of connected line segments extending between said flat surface to form a closed-loop polygon in which a normal to each of said flat surfaces passes through the vertex of adjacent ones of said connected line segments intersects the flat surface and bisects the angle between said adjacent line segments;
    boring a first set of cavities through said block along said selected group of line segments;
    boring at least a second set of cavities through said block similarly arranged as said first set of cavities; and
    slicing said block into separate block portions having a single set of cavities.

6. The method of claim 5 further comprising the step of polishing said flat surfaces before slicing said block.

7. The method of claim 5 wherein said polygon is a triangle.

8. The method of claim 5 wherein said block is comprised of a boro-silicate glass.

* * * * *